(12) United States Patent
Nalbant

(10) Patent No.: US 10,511,222 B2
(45) Date of Patent: *Dec. 17, 2019

(54) WIRELESS POWER TRANSMITTER HAVING LOW NOISE AND HIGH EFFICIENCY, AND RELATED METHODS

(71) Applicant: Integrated Device Technology, Inc., San Jose, CA (US)

(72) Inventor: Mehmet K. Nalbant, Cupertino, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,747

(22) Filed: Jan. 10, 2019

(65) Prior Publication Data

US 2019/0222115 A1 Jul. 18, 2019

Related U.S. Application Data

(63) Continuation of application No. 14/075,749, filed on Nov. 8, 2013, now Pat. No. 10,211,720.

(Continued)

(51) Int. Cl.
| | |
|---|---|
| *H02M 7/538* | (2007.01) |
| *H02M 7/5387* | (2007.01) |
| *H02J 7/02* | (2016.01) |
| *H02J 50/12* | (2016.01) |
| *H02M 7/48* | (2007.01) |
| *H02J 5/00* | (2016.01) |

(Continued)

(52) U.S. Cl.
CPC ............... *H02M 1/38* (2013.01); *H02J 7/025* (2013.01); *H02J 50/12* (2016.02); *H02M 7/538* (2013.01); *H02M 7/5387* (2013.01); *H02J 5/005* (2013.01); *H02J 50/60* (2016.02); *H02M 2007/4815* (2013.01); *Y02B 70/1441* (2013.01); *Y10T 29/49117* (2015.01)

(58) Field of Classification Search
CPC . H02J 5/005; H02J 7/025; H02J 17/00; H04B 5/0025-0093; B60L 11/182; B60L 11/1829-1831; Y02T 90/122; H01F 38/14; H01F 2038/143-146
See application file for complete search history.

(56) References Cited

U.S. PATENT DOCUMENTS 4,953,068 A 8/1990 Henze
6,548,985 B1 4/2003 Hayes et al.
(Continued)

*Primary Examiner* — Rexford N Barnie
*Assistant Examiner* — Terrence R Willoughby
(74) *Attorney, Agent, or Firm* — Haynes and Boone, LLP

(57) ABSTRACT

A wireless power transmitter comprises a bridge inverter including a first switch and a second switch coupled together with a first switching node therebetween, and a first capacitor coupled to the first switching node. The transmitter further includes control logic configured to control the first switch and the second switch according to an operating frequency to generate an AC power signal from a DC power signal, and a resonant tank operably coupled to the first switching node of the bridge inverter, the resonant tank configured to receive the AC power signal and generate an electromagnetic field responsive thereto. A method for operating the wireless power transmitter and a method for making the wireless power transmitter are also disclosed.

20 Claims, 5 Drawing Sheets

Related U.S. Application Data

(60) Provisional application No. 61/724,841, filed on Nov. 9, 2012.

(51) Int. Cl.
*H02M 1/38* (2007.01)
*H02J 50/60* (2016.01)

(56) References Cited

U.S. PATENT DOCUMENTS

| | | |
|---|---|---|
| 2003/0040291 A1 | 2/2003 | Brewer |
| 2010/0148723 A1 | 6/2010 | Cook et al. |
| 2010/0219757 A1 | 9/2010 | Benzerrouk et al. |
| 2010/0225173 A1* | 9/2010 | Aoyama ............. H02J 5/005 307/104 |
| 2011/0254377 A1 | 10/2011 | Wildmer et al. |
| 2012/0127765 A1* | 5/2012 | Maruyama ............ H02J 50/12 363/126 |
| 2013/0147280 A1 | 6/2013 | Oettinger |
| 2013/0257360 A1 | 10/2013 | Singh |

* cited by examiner

WIRELESS POWER TRANSMITTER HAVING LOW NOISE AND HIGH EFFICIENCY, AND RELATED METHODS

CROSS-REFERENCE TO RELATED APPLICATION

This application is a continuation of U.S. patent application Ser. No. 14/075,749, filed Nov. 8, 2013, incorporated herein by reference, which claims the benefit of U.S. provisional application No. 61/724,841, filed Nov. 9, 2012, incorporated herein by reference.

FIELD

Embodiments of the present disclosure relate generally to wireless power transfer and, more particularly, to apparatuses and methods related to a wireless power transmitter.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled electromagnetic field. In wireless power transmission, power is transferred by transmitting an electromagnetic field through a transmit coil. On the receiver side, a receive coil may couple with the transmit coil through the electromagnetic field, thus, receiving the transmitted power wirelessly. The distance between the transmit and receive coils, at which efficient power transfer can take place, is a function of the transmitted energy and the required efficiency. The coupling coefficient (k) is a function of the distance between the coils, the coil sizes, and materials. The power conversion efficiency (e.g., coupling factor, coupling quality) maybe significantly improved if the coils are sized and operated at such a frequency that they are physically within the so-called "near-field zone" of each other.

Wireless power systems are generally intended to operate in a frequency range substantially near (e.g., exactly at) the peak resonance of the resonant tanks of the wireless power devices. The operating frequency of a wireless power transmitter may be determined by the switching frequency of the gate drives of the bridge inverter used to convert a DC signal to the AC signal used to generate the wireless power signal. The faster the gates of the switches are switched, the faster the rate of change (dv/dt) of the switching voltage exists on the switching nodes between the switches. An electrical node that has a relatively fast rate of change (dv/dt) may capacitively couple easily to surrounding circuitry. Through such parasitic capacitive coupling, the faster the rate of change (dv/dt), the more current will flow in undesirable places (e.g., the leads of the wireless power transmitter, other components of the system, etc.). As a result, electromagnetic interference (EMI) may be introduced into the system. Conventional wireless power transmitters may introduce filters between the switch controller and the gates of the switches to slow down the gate drives to the switches of the bridge inverter. Slowing down the rate of change (dv/dt) for the gate drives of the switches may come at the expense of power loss in the switches.

Thus, in a wireless power transfer power stage there are often times conflicting requirements for low noise emissions and high operational efficiency. Low noise emissions may require the switches of a conventional power transfer stage to switch relatively slowly such that the rate of change (dv/dt) of the switching voltages are not very high, which may come at the expense of power loss in the switches—both when being enabled and disabled. On the other hand, high efficiency of a conventional power transfer stage may require that the switches are switched relatively fast, but which may result in fast rate of change of the switching voltages and increased noise.

BRIEF SUMMARY

Embodiments of the present disclosure include a wireless power transmitter. The wireless power transmitter comprises a bridge inverter including a first switch and a second switch coupled together with a first switching node therebetween, and a first capacitor coupled to the first switching node. The wireless power transmitter further comprises control logic configured to control the first switch and the second switch according to an operating frequency to generate an AC power signal from a DC power signal, and a resonant tank operably coupled to the first switching node of the bridge inverter, the resonant tank configured to receive the AC power signal and generate an electromagnetic field responsive thereto.

Another embodiment of the present disclosure includes a method of operating a wireless power transmitter. The method comprises operating a first switch and a second switch of a bridge inverter according to an operating frequency to generate an AC signal from a DC signal, the first switch and the second switch having a first capacitor coupled at a first switching node therebetween. The method further comprises generating a wireless power signal through a resonant capacitor and a transmit coil coupled to the first switching node.

Another embodiment of the present disclosure includes a method of making a wireless power transmitter. The method comprises coupling at least one capacitor to at least one switching node of a bridge inverter of a wireless power transmitter, and coupling at least one resonant capacitor and at least one transmit coil to the at least one switching node.

DETAILED DESCRIPTION

Figure 1:
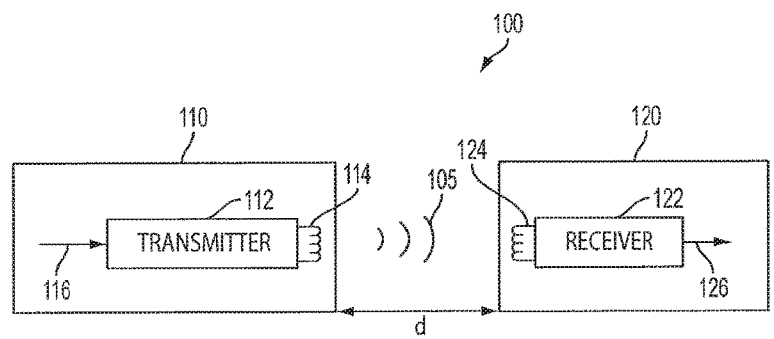
FIG. 1 is a schematic block diagram of a wireless power transfer system according to an embodiment of the present disclosure.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions maybe shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. In addition, elements of a wireless power transmitter (including a bridge inverter) may be implemented using discrete components, as an integrated circuit (IC), or combinations thereof.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both non-transitory computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the disclosure may include apparatuses, systems, and methods related to a wireless power transmitter. In particular, the wireless power transmitter may comprise a bridge inverter including a capacitor coupled to a switching node between the switches of the bridge inverter. The wireless power transmitter may further include control logic configured to control the switches of the bridge inverter according to a desired break-before-make timing. As a result, the voltage level at the switching node may exhibit a relatively slow rate of change while improving efficiency of the wireless power transmitter by reducing switching losses of the switches compared with conventional wireless power transmitters.

FIG. 1 is a schematic block diagram of a wireless power transfer system 100 according to an embodiment of the present disclosure. The wireless power transfer system 100 includes a wireless power transmitting apparatus 110, and a wireless power receiving apparatus 120. The wireless power transmitting apparatus 110 includes a wireless power transmitter 112 having a transmit coil 114 configured to generate an electromagnetic field 105 for providing power transfer to the wireless power receiving apparatus 120. The wireless power receiving apparatus 120 includes a wireless power receiver 122 having a receive coil 124 configured to couple with the electromagnetic field 105. The transmit coil 114 and the receive coil 124 may be sized according to the particular devices and applications to be associated therewith. The electromagnetic field 105 may also be referred to as the wireless power signal 105 for power transfer from the wireless power transmitter 112 to the wireless power receiver 122.

An input signal 116 may be provided to the wireless power transmitter 112 for providing the wireless power transmitter 112 with the power for generating the wireless power signal 105 that provides a power transfer to the wireless power receiving apparatus 120. The wireless power receiver 122 may couple to the wireless power signal 105 and generate an output signal 126 in response thereto. The output signal 126 may provide the power that is used by the wireless power receiving apparatus 120 for storing (e.g., charging a battery), consumption (e.g., providing system power), or both.

The wireless power transmitter 112 and the wireless power receiver 122 are separated by a distance (d). In some embodiments, the wireless power transmitter 112 and the wireless power receiver 122 may be configured according to a mutual inductance relationship, such that when the resonant frequency of the wireless power receiver 122 and the resonant frequency of the wireless power transmitter 112 are substantially identical, transmission losses between the wireless power transmitter 112 and the wireless power receiver 122 are minimal. Likewise, the frequency of the wireless power signal 105 may be set by the wireless power transmitter 112 at or near the resonant frequencies of the coils 114, 124. As a result, an efficient power transfer occurs by coupling a large portion of the energy in the near-field of the transmit coil 114 to the receive coil 124 rather than propagating most of the energy in an electromagnetic wave to the far-field. If the wireless power receiving apparatus 120 is in the near-field (within some distance (d)), inductive coupling may occur between the transmit coil 114 and the receive coil 124. The area around the transmit coil 114 and receive coil 124 where this near-field inductive coupling may occur may be referred to as a "coupling region." Because of this mutual inductance relationship, the wireless power transfer may be referred to as inductive wireless power transfer.

The transmit coil 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power transmitting apparatus 110 may include a wireless power transmitter to transmit the wireless power signal 105. The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which wireless power signal 105 may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter.

Figure 2:
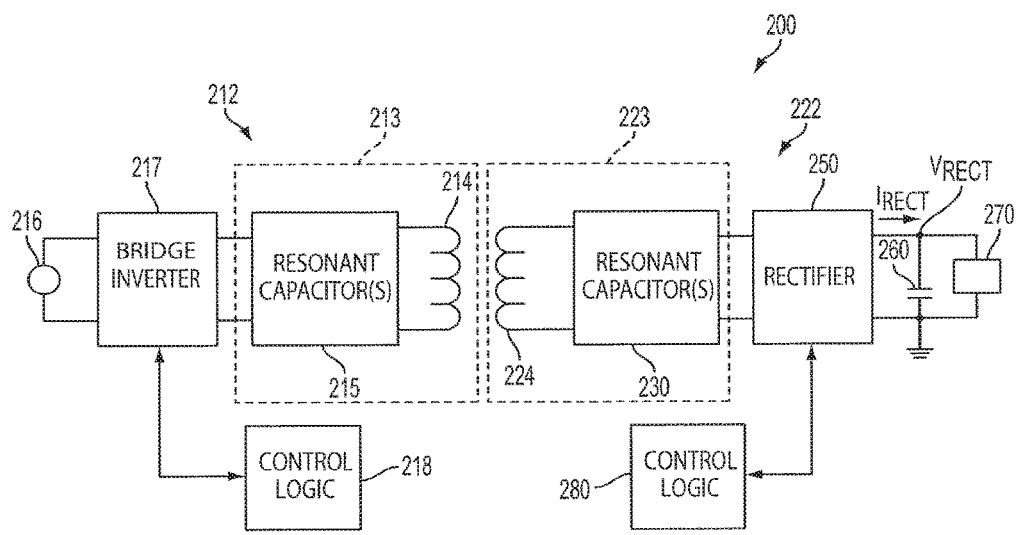
FIG. 2 is a schematic block diagram of a wireless power transfer system according to an embodiment of the present disclosure.

FIG. 2 is a schematic block diagram of a wireless power transfer system 200 according to an embodiment of the present disclosure. The wireless power transfer system 200 includes a wireless power transmitter 212 having a resonant tank 213 that includes a transmit coil 214 coupled with resonant capacitors 215. The wireless power transmitter 212 includes a bridge inverter 217 and control logic 218 coupled with the resonant tank 213. The bridge inverter 217 of the wireless power transmitter 212 may include a full-bridge inverter, a half-bridge inverter, or other appropriate circuit for receiving a DC input signal 216 and generate an AC signal through the transmit coil 114 for generating the wireless power signal 105. The wireless power receiver 222 includes a resonant tank 223 having a receive coil 224 coupled with resonant capacitors 230. The resonant capacitors 230 are coupled with a rectifier 250. The wireless power transmitter 212 and the wireless power receiver 222 may be incorporated within a wireless power transmitting apparatus 110 (FIG. 1) and a wireless power receiving apparatus 120 (FIG. 1), respectively. The transmit coil 214 and the receive coil 224 (and other components) may be sized according to the particular devices and applications to be associated therewith.

The control logic 218 of the wireless power transmitter 212 may be configured to control one or more operations of the wireless power transmitter 212. Similarly, the control logic 280 of the wireless power receiver 222 may be configured to control one or more operations of the wireless power receiver 222. Each of the control logic 218, 280 may be implemented within a processor (e.g., microcontroller) or other circuitry that is configured (e.g., programmed) to perform various operations of embodiments of the present disclosure. Each of the control logic 218, 280 may further include computer-readable media (e.g., memory) storing computing instructions for execution by the processor related to performing processes of the embodiments of the present disclosure. Memory may include volatile and non-volatile memory.

The wireless power transmitter 212 may be configured to generate a wireless power signal 105 (FIG. 1) responsive to a DC input signal 216 received by the resonant tank 213. The wireless power receiver 222 may be configured to couple with the wireless power signal 150 (which induces an AC current in the receive coil 224) and generate an output power signal (a DC signal) to provide power to a load 270. As a result, the output power signal may include a rectified voltage ($V_{RECT}$) and rectified current ($I_{RECT}$) that is provided to the load 270. The load 270 may include an energy storage device (e.g., battery, such as a lithium-ion battery), system components of a wireless power enabled device, or a combination thereof. Thus, the output signal from the wireless power receiver 222 may be used for charging an energy storage device and/or for providing system power to the various system components of a device.

The wireless power transmitter 212 and wireless power receiver 222 may be generally configured as discussed above with respect to FIG. 1. The configurations of the LC networks within the resonant tanks 213, 223 may generally determine the resonant frequencies of the wireless power transmitter 212 and the wireless power receiver 222, respectively. For example, the resonant frequency of the resonant tanks 213, 223 may be based on the inductance of their respective inductive coil and the capacitance of the plates of the capacitors. The wireless power transmitter 212 and the wireless power receiver 222 may be configured according to a mutual inductance relationship, such that when the resonant frequency of the wireless power receiver 222 and the resonant frequency of the wireless power transmitter 212 are substantially identical, transmission losses between the wireless power transmitter 212 and the wireless power receiver 222 are minimal. As a result, the coupling efficiency and wireless power transfer may be improved. In addition, the frequency of the wireless power signal 105 may be set by the wireless power transmitter 212 at or near the resonant frequencies of the wireless power transmitter 212 and wireless power receiver 222 for minimal transmission losses.

During wireless power transmission, the input signal 216 (a DC signal) may be received by the bridge inverter 217. The bridge inverter 217 may generate an AC current that flows through the resonant tank 213 to generate a time-varying electromagnetic field for transmitting the wireless power signal 105. Thus, the wireless power signal 105 may be a time-varying signal that is substantially sinusoidal, having a frequency that may be based on the switching frequency of the bridge inverter 217 of the wireless power transmitter 212. In some embodiments, the frequency of the wireless power signal 105 may be set according to the desired frequency, such as a frequency for a particular wireless power standard. The resonant tank 213 may be configured such that the resonant frequency is approximately the frequency of the wireless power signal 105. In some embodiments, it may be desirable for the frequency of the wireless power signal 105 to differ somewhat from the resonant frequency of the resonant tank 213, such as to reduce the peak-to-peak current through the transmit coil 214.

In order to receive wireless power signal 105, the wireless power receiver 222 may be placed in the coupling region of the wireless power transmitter 212 such that inductive coupling may be achieved. As a result, the wireless power receiver 222 may receive the wireless power signal 105 and generate an AC power responsive thereto. In order for the power to be used by the load 270, the AC power may be converted to a DC power. The rectifier 250 may generate a rectified voltage ($V_{RECT}$) as well as a rectified current ($I_{RECT}$) flowing through the resonant tank 223. In some embodiments, the rectifier 250 may be configured as asynchronous rectifier. As a result, the rectifier 250 may include one or more switches that are controlled in such a manner to generate the DC output power signal (i.e., rectified voltage ($V_{RECT}$) and rectified current ($I_{RECT}$)). In some embodiments, the rectifier 250 may include one or more diodes configured to generate the DC output power signal.

The wireless power transmitter 212 may be configured to control the bridge inverter 217 to set the switching frequency for the desired operating frequency. In addition, each of the control logic 218, 280 may further control other functions of the respective wireless power transmitter 212, wireless power receiver 222, such as controls related to modulation/demodulation, foreign object detection, device operation, etc. The control logic 218, 280 may each include different sub-blocks that perform one or more of the above functions separately rather than by employing within a single process, routine, program, etc. In addition, the control logic 218, 280 may each employ different hardware elements for different functions.

It should be recognized that the devices of a wireless power transfer system 200 may include additional components to perform other features not specifically described herein or shown in the various figures. For example, wireless power enabled devices may include a modulator and/or a demodulator for communicating with other devices, foreign object detection modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to decrease the rate of change (dv/dt) of the switching voltages of the wireless power transmitter.

FIGS. 3A-3D are schematic diagrams of various configurations of a bridge inverter 217 for a wireless power transmitter 212 (FIG. 2) according to an embodiment of the present disclosure. The bridge inverter 217 may be configured to receive and convert a DC input signal 216 to an AC signal to flow through the resonant tank 213 that generates the wireless power signal 105. The resonant tank 213 includes at least one resonant capacitor 215 and the transmit coil 214, which may be coupled in series, and which may be the primary contributors to the resonant frequency of the wireless power transmitter 212.

The bridge inverters 217 of FIGS. 3A-3D are configured as full-bridge inverters that include switches 302, 304, 306, 308 coupled to the resonant tank 213. The switches 302, 304 may be configured as power MOSFETs or other suitable transistors. The switches 302, 304 may be serially coupled on one side of the resonant tank 213, and switches 306, 308 may be serially coupled on the other side of the resonant tank 213. In an example, the drain of the high-side switch 302 may be coupled to a supply voltage (i.e., the input voltage $V_{IN}$), and the source of the low-side switch 304 may be coupled to ground. The source of the high-side switch 302 and the drain of the low-side switch 304 may be coupled at the switching node. The high-side switch 306 and the low-side switch 308 on the other side of the bridge inverter 217 may be similarly coupled. The high-side switches 302, 306 may include p-channel (e.g., PMOS) transistors that are enabled when the gate drive voltages $V_{G1}$, $V_{G4}$ are low. The low-side switches 304, 308 may include n-channel (e.g., NMOS) transistors that are enabled if the gate drive voltages $V_{G2}$, $V_{G3}$ are high. Of course, other combinations of p-channel and n-channel transistors are contemplated for the switches 302, 304, 306, 308.

The resonant tank 213 may be coupled to the switching nodes (labeled by their switching voltages $V_{SW1}$, $V_{SW2}$ on the nodes) that are located between the respective switches 302, 304, 306, 308. The switches 302, 304, 306, 308 may be controlled by the control logic 218 (FIG. 2). In particular, the control logic 218 (e.g., a switching controller) may transmit control signals (i.e., gate drive voltages $V_{G1}$, $V_{G2}$, $V_{G3}$, $V_{G4}$) to alternatingly enable and disable the switches 302, 304, 306, 308 according to a desired operating frequency (i.e., switching frequency). In other words, switches 302, 304 may be complementary enabled with each other, while switches 306, 308 may be complementary enabled with each other. As an example, the operating frequency may depend on a standard for which the wireless power transmitter 212 is desired to operate. Exemplary wireless power standards include the Wireless Power Consortium (WPC), the Power Matters Alliance (PMA), and the Alliance for Wireless Power (A4WP).

The bridge inverter 217 may further include capacitors 390, 392 that are coupled at the switching nodes between the switches 302, 304, 306, 308. In particular, the first capacitor 390 is coupled to the switching node between the switches 302, 304, and the second capacitor is coupled to the switching node between the switches 306, 308.

In operation, the switches 302, 304, 306, 308 are complementary enabled and disabled according to a desired operating frequency. The faster the gates of the switches 302, 304, 306, 308 are switched, the faster the rate of change (dv/dt) of the switching voltage $V_{SW1}$, $V_{SW2}$ exists on the switching nodes. As discussed above, an electrical node that has a relatively fast rate of change (dv/dt) may capacitively couple easily to surrounding circuitry, which may introduce EMI and noise into the system. Thus, rather than slowing down the rate of change (dv/dt) of the gate drive voltages $V_{G1}$, $V_{G2}$, $V_{G3}$, $V_{G4}$, the capacitors 390, 392 slow down the rate of change (dv/dt) of the switching voltages V.sub.SW1, V.sub.SW2 on the switching nodes between the switches 302, 304, 306, 308. As a result, the wireless power transmitter 212 may experience relatively low noise from capacitive coupling to the surrounding circuitry, while reducing the power losses typically incurred by conventional wireless power transmitters.

During switching, the high-side switch 302 is disabled and the low-side switch 304 is enabled. Because the switches 302, 304 are physical devices (i.e., not ideal), the switching does not occur instantaneous. If the high-side switch 302 and the low-side switch 304 were at least partially enabled at the same time, there may be a short between the power supply and ground. As a result, the switches 302, 304 or other components may be damaged by an uncontrolled current flow between the two terminals. In order to avoid this situation, the control logic 218 may be configured to add a "break-before-make" time into the timing of driving the gate drive voltages $V_{G1}$, $V_{G2}$, $V_{G3}$, $V_{G4}$. The break-before-make time is an amount of delay between the time that one switch (e.g., high-side switch 302) is disabled and the other switch (e.g., low-side switch 304) is enabled. In order to accommodate the slower rate of change (dv/dt) on the switching nodes, the break-before-make time may be increased in comparison to conventional wireless power transmitters. For example, some conventional wireless power transmitters may have a break-before-make time between approximately 10 ns to 20 ns, whereas embodiments of the present disclosure may be an order of magnitude higher (e.g., between approximately 150 ns to 200 ns) depending on the particular application. Other ranges of break-before-make times are also contemplated, such as a range between 10 ns to 1 µs. The break-before make timing may be pre-determined or determined on the fly.

The rate of change (dv/dt) of each of the switching voltages $V_{SW1}$, $V_{SW2}$ depends on the value of the capacitors 390, 392 and the amount of current flowing therethrough. For example, the capacitance of each of the capacitors 390, 392 may be in the range of 100 pF to 100 nF; however, other values are contemplated. The current is typically stored in the transmit coil 214, which acts as a pseudo current source. Each time the switches 302, 304, 306, 308 are enabled and disabled, energy is stored in the transmit coil 214. During the time that both switches 302, 304 are disabled, energy is pumped back into the capacitor 390. Over a period of time, the switching voltage $V_{SW1}$ increases toward the supply voltage $V_{IN}$. The amount of time for the switching voltage to increase to approximately equal the supply voltage may be known if the current and the capacitance of the capacitor 390 may be known. Therefore, the control logic 218 may implement a break-before-make time that is at least as long as the amount of time for the switching voltage $V_{SW1}$ to increase to approximately equal the supply voltage $V_{IN}$, which allows the switching voltage $V_{SW1}$ to naturally slew up and slew down at the desired slow rate. Although the operation of the switches 302 and 304 is used as an example to describe the operation of the bridge inverter 217, the operation of switches 306, 308 may be performed similarly.

Figure 3A:
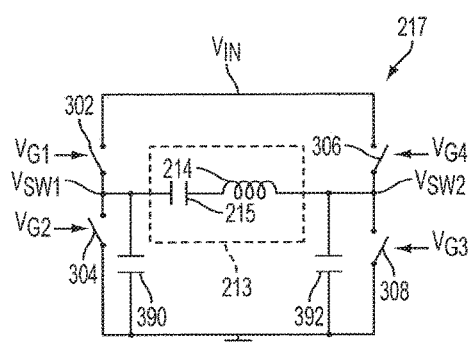
FIGS. 3A-3D are schematic diagrams of various configurations of abridge inverter for a wireless power transmitter according to an embodiment of the present disclosure.
Figure 3B:
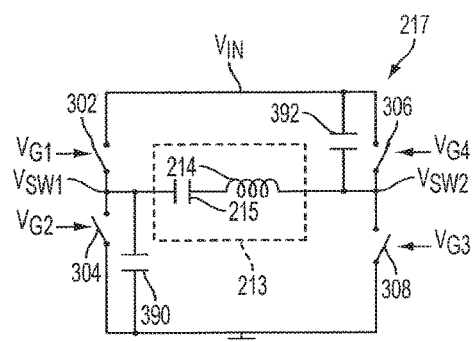
Figure 3C:
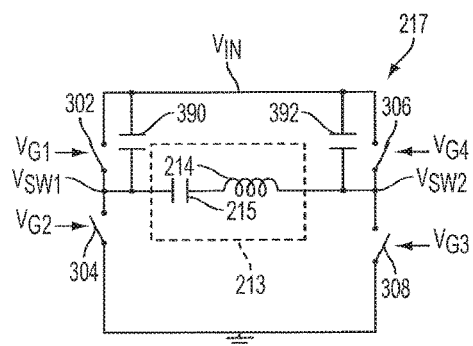
Figure 3D:
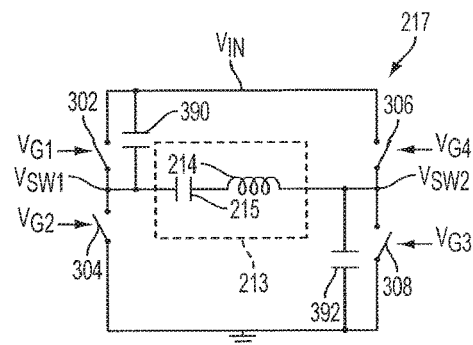

Referring individually to the various configurations of FIGS. 3A-3D, the placement of the capacitors 390, 392 may vary. For example, as shown in FIG. 3A the first capacitor 390 may be coupled between the first switching node and ground, and the second capacitor 392 may be coupled between the second switching node and ground. As shown in FIG. 3B, the first capacitor 390 may be coupled between the first switching node and ground, and the second capacitor 392 may be coupled between the second switching node and the supply voltage $V_{IN}$. As shown in FIG. 3C, the first capacitor 390 may be coupled between the first switching node and the supply voltage $V_{IN}$, and the second capacitor 392 may be coupled between the second switching node and the supply voltage $V_{IN}$. As shown in FIG. 3D, the first capacitor 390 may be coupled between the first switching node and the supply voltage $V_{IN}$, and the second capacitor 392 may be coupled between the second switching node and ground.

Figure 4A:
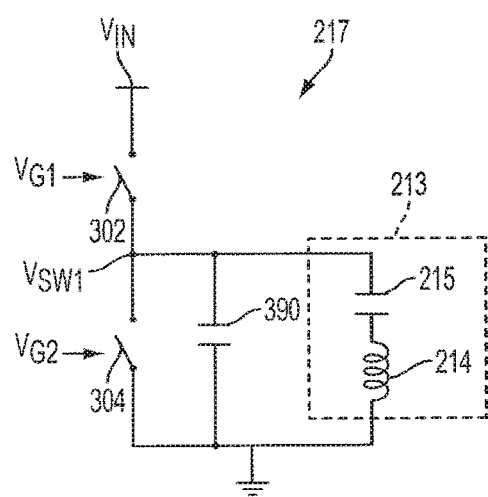
FIGS. 4A, 4B are schematic diagrams of are schematic diagrams of various configurations of a bridge inverter for a wireless power transmitter according to an embodiment of the present disclosure.
Figure 4B:
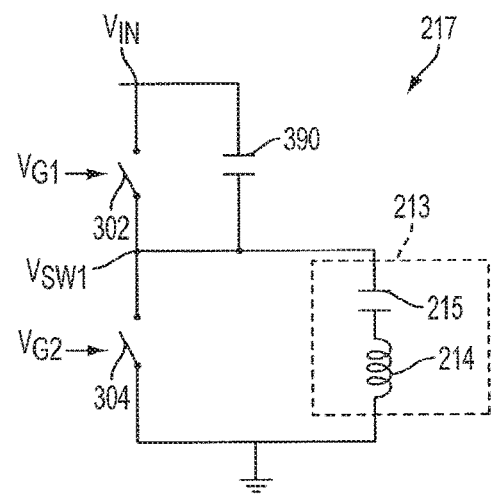

FIGS. 4A, 4B are schematic diagrams of are schematic diagrams of various configurations of a bridge inverter 217 for a wireless power transmitter 212 (FIG. 2) according to an embodiment of the present disclosure. In particular, the bridge inverters 217 of FIGS. 4A, 4B are configured as half-bridge inverters that include switches 302, 304 coupled to the resonant tank 213. The switches 302, 304 may be configured as power MOSFETs or other suitable transistors. The switches 302, 304 maybe serially coupled having a switching node therebetween. In an example, the drain of the high-side switch 302 may be coupled to a supply voltage (i.e., the input voltage $V_{IN}$), and the source of the low-side switch 304 may be coupled to ground. The source of the high-side switch 302 and the drain of the low-side switch 304 may be coupled at the switching node. The high-side switch 302 may include a p-channel (e.g., PMOS) transistor that is enabled when the gate drive voltages $V_{G1}$ is low. The low-side switch 304 may include an n-channel (e.g., NMOS) transistor that is enabled if the gate drive voltage $V_{G2}$ is high. The resonant tank 213 coupled between the switching node of the switches 302, 304 and ground.

The bridge inverter 217 may further include the capacitor 390 coupled to the switching node. In some embodiments, the capacitor 390 maybe coupled between the switching node and ground (FIG. 4A). In some embodiments, the capacitor 390 may be coupled between the switching node and the supply voltage $V_{IN}$ (FIG. 4B). The operation of the bridge inverter 217 may operate similarly as described above with respect to FIGS. 3A-3D, but without any switches on the other side of the resonant tank 213.

Figure 5A:
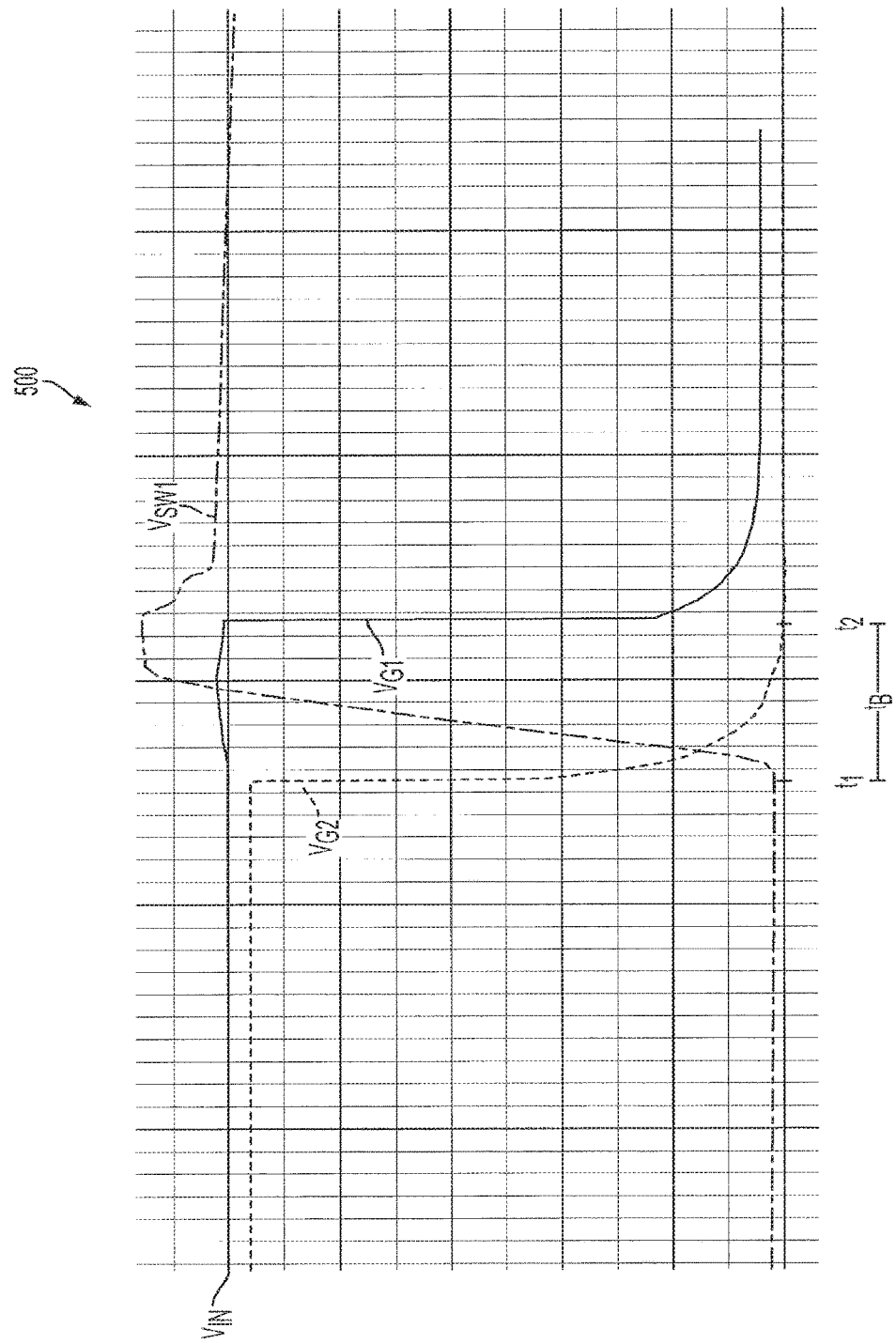
FIGS. 5A, 5B are waveforms illustrating the operation of the switches of the bridge inverter of a wireless power transmitter according to an embodiment of the present disclosure.
Figure 5B:
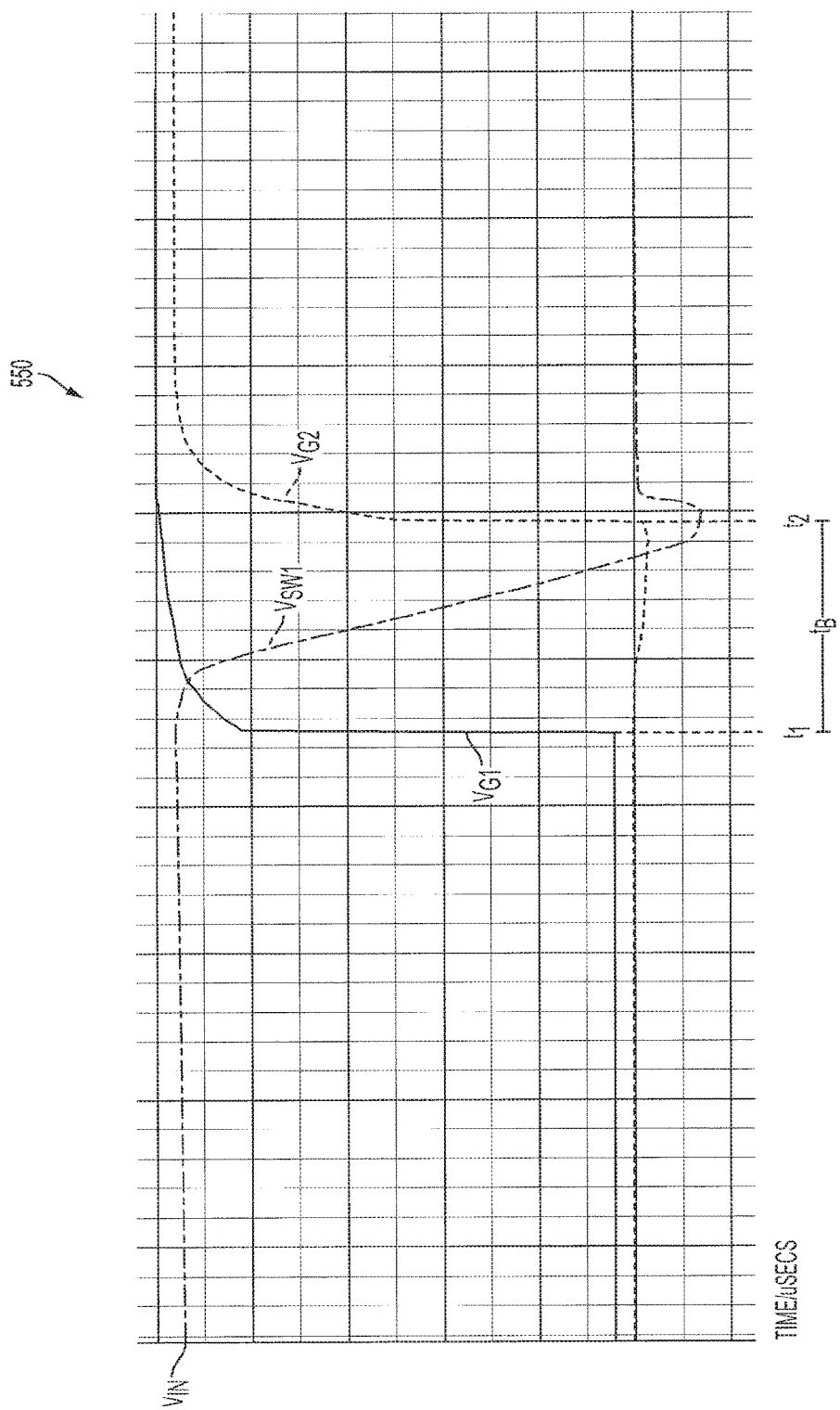

FIGS. 5A, 5B are waveforms illustrating the operation of the switches 302, 304 (switches 306, 308 may operate similarly) of the bridge inverter 217 of a wireless power transmitter 212 according to an embodiment of the present disclosure. The switches 302, 304 may be complementary enabled such that the switches 302, 304 alternate being enabled (i.e., on) and disabled (i.e., off). In particular, FIG.

5A illustrates the transition of the low-side switch 304 from being enabled to being disabled, and the high-side switch 302 from being disabled to being enabled. FIG. 5B, on the other hand, illustrates the opposing action of the high-side switch 302 transitioning from being enabled to being disabled, and the low-side switch 304 transitioning from being disabled to being enabled.

Referring specifically to FIG. 5A, at time $t_1$ the control logic 218 deasserts the second gate drive voltage $V_{G2}$ while the first gate drive voltage $V_{G1}$ remains asserted. Because the low-side switch 304 is an n-channel transistor, the low-side switch 304 transitions from being enabled to being disabled at time $t_1$. At time t2, the control logic 218 deasserts the first gate drive voltage $V_{G1}$ while the second gate drive voltage $V_{G2}$ remains deasserted. Because the high-side switch 302 is a p-channel transistor, the high-side switch 302 transitions from being disabled to being enabled at time t2. Thus, the time period $t_B$ is the break-before-make time set by the control logic 218 to ensure that the low-side switch 304 is completely disabled prior to enabling the high-side switch 302. In other words, during the break-before-make time, both switches 302, 304 are disabled.

When the low-side switch 304 transitions from being enabled to being disabled, the low-side switch 304 ceases to conduct current. As a result, the current in the bridge inverter 217 is diverted to the capacitor 390. In addition, the first switching voltage $V_{SW1}$ begins to rise according to a rate of change (dv/dt) across the capacitor 390. As a result, the rate of change (dv/dt) of the first switching voltage $V_{SW1}$ is relatively slower than conventional wireless power transmitters. For example, the first switching voltage may reach the supply voltage $V_{IN}$ in approximately 150 ns to 200 ns in comparison with 10 ns to 20 ns for a conventional wireless power transmitter. The break-before make times may also be similar as those times.

Referring specifically to FIG. 5B, at time $t_1$ the control logic 218 asserts the first gate drive voltage $V_{G1}$ while the second gate drive voltage $V_{G2}$ remains deasserted. Because the high-side switch 302 is a p-channel transistor, the high-side switch 302 transitions from being enabled to being disabled at time $t_1$. At time t2, the control logic 218 asserts the second gate drive voltage $V_{G2}$ while the first gate drive voltage $V_{G2}$ remains asserted. Because the low-side switch 304 is an n-channel transistor, the low-side switch 304 transitions from being disabled to being enabled at time t2. Thus, the time period $t_B$ is the break-before-make time set by the control logic 218 to ensure that the high-side switch 302 is completely disabled prior to enabling the low-side switch 304. During this transition, the switching voltage $V_{SW1}$ decreases toward ground according to a rate of change (dv/dt) across the capacitor 390. Similar to the first transition, the rate of change (dv/dt) may be relatively slower than conventional wireless power transmitters. As a result, a relatively high efficiency, low noise, wireless power transfer stage may be achieved.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless power transmitter, comprising:
  a bridge inverter including
    a first switch and a second switch coupled together with a first switching node therebetween, the first and second switches being in series between a first terminal and a second terminal, the first and second terminals to receive a DC power signal comprising a first terminal voltage and a second terminal voltage lower in magnitude than the first terminal voltage; and
    a first capacitor coupled between the first switching node and a first voltage;
    wherein the first switch is controlled by a first control signal, and the second switch is controlled by a second control signal;
  control logic configured to generate the first and second control signals to complementarily open and close the first switch and the second switch according to an operating frequency to generate an AC power signal from the DC power signal, the control logic generating the first and second control signals complimentarily opening and closing the first switch and the second switch with a first delay between generating the first control signal to open the first switch and generating the second control signal to close the second switch, and with a second delay between generating the second control signal to open the second switch and generating the first control signal to close the first switch; and
  a resonant tank operably coupled to the first switching node of the bridge inverter, the resonant tank configured to receive the AC power signal and generate an electromagnetic field responsive thereto;
  wherein a capacitance of the first capacitor is sufficient to lengthen, by a factor of at least 7.5, a length of time for the first switching node voltage to reach the first terminal voltage during the second delay.

2. The wireless power transmitter of claim 1, wherein said factor is at least 10.

3. The wireless power transmitter of claim 1, wherein the bridge inverter includes a full bridge inverter.

4. The wireless power transmitter of claim 3, wherein the bridge inverter further includes:
  a third switch and a fourth switch coupled together with a second switching node therebetween; and
  a second capacitor coupled between the second switching node and a second voltage;
wherein the resonant tank is operably coupled to the second switching node of the bridge inverter.

5. The wireless power transmitter of claim 4, wherein the resonant tank includes at least one resonant capacitor operably coupled with a transmit coil between the first switching node and the second switching node.

6. The wireless power transmitter of claim 4, wherein:
  the first voltage is ground such that the first capacitor is coupled between the first switching node and ground; and
  the second voltage is ground such that the second capacitor is coupled between the second switching node and ground.

7. The wireless power transmitter of claim 4, wherein:
  the first voltage is a power supply such that the first capacitor is coupled between the first switching node and the power supply; and
  the second voltage is ground such that the second capacitor is coupled between the second switching node and ground.

8. The wireless power transmitter of claim 4, wherein:
the first voltage is a power supply such that the first capacitor is coupled between the first switching node and the power supply; and
the second voltage is the power supply such that the second capacitor is coupled between the second switching node and the power supply.

9. The wireless power transmitter of claim 4, wherein:
the first voltage is ground such that the first capacitor is coupled between the first switching node and ground; and
the second voltage is a power supply such that the second capacitor is coupled between the second switching node and the power supply.

10. The wireless power transmitter of claim 1, wherein the bridge inverter includes a half-bridge inverter.

11. A method comprising:
operating a first switch and a second switch of a bridge inverter according to an operating frequency to generate a wireless power AC signal from a DC power signal supplied to a first terminal of the bridge inverter and a second terminal of the bridge inverter, the DC power signal comprising a first terminal voltage and a second terminal voltage lower in magnitude than the first terminal voltage, the first switch and the second switch being in series between the first and second terminals and having a first switching node therebetween, the bridge inverter having a first capacitor coupled between the first switching node and a first voltage, wherein the first switch is controlled by a first control signal, and the second switch is controlled by a second control signal, and the first and second control signals are generated to complementarily open and close the first switch and the second switch according to an operating frequency to generate an AC power signal from the DC power signal, the first and second control signals complimentarily opening and closing the first switch and the second switch with a first delay between generating the first control signal to open the first switch and generating the second control signal to close the second switch, and with a second delay between generating the second control signal to open the second switch and generating the first control signal to close the first switch; and
generating the wireless power AC signal through a resonant capacitor and a transmit coil coupled to the first switching node,
wherein a capacitance of the first capacitor is sufficient to lengthen, by a factor of at least 7.5, a length of time for the first switching node voltage to reach the first terminal voltage during the second delay.

12. The method of claim 11 wherein said factor is at least 0.

13. The method of claim 11 wherein each of the first and second delays is sufficient to prevent the first switch and the second switch being closed at the same time.

14. The method of claim 11, further comprising complementarily operating a third switch and a fourth switch of the bridge inverter according to the operating frequency to generate the AC signal from the DC signal, the third switch and the fourth switch having a second capacitor coupled between (a) a second switching node between the third and fourth switches, and (b) a second voltage.

15. A wireless power transmitter, comprising:
a bridge inverter including
a first switch coupled between a first switching node and a first terminal, the first terminal being for receiving a first terminal voltage;
a second switch coupled between the first switching node and a second terminal, the second terminal being for receiving a second terminal voltage lower in magnitude than the first terminal voltage, the first and second terminal voltages providing a DC power signal;
a first capacitor coupled between the first switching node and a first voltage;
a third switch coupled between a second switching node and the first terminal;
a fourth switch coupled between the second switching node and the second terminal;
a second capacitor coupled between the second switching node and a second voltage;
control logic configured to complementarily open and close the first switch and the second switch according to an operating frequency, and to complementarily open and close the third switch and the fourth switch according to the operating frequency, to generate an AC power signal from the DC power signal; and
a resonant tank operably coupled to the first switching node and the second switching node, the resonant tank configured to receive the AC power signal and generate an electromagnetic field responsive thereto;
wherein a capacitance of the first capacitor and a capacitance of the second capacitor are sufficient to lengthen, by a factor of at least 7.5, a length of time for at least one of the first and second switching node voltages to rise to the first terminal voltage in response to closing of the respective one of the second and fourth switches.

16. The wireless power transmitter of claim 15, wherein said factor is at least 10.

17. The wireless power transmitter of claim 15, wherein in operation the first and second switches are never closed at the same time.

18. The wireless power transmitter of claim 15, wherein in operation the third and fourth switches are never closed at the same time.

19. The wireless power transmitter of claim 15, wherein one of the first and second voltages is the same as the first terminal voltage, and the other one of the first and second voltages is the same as the second terminal voltage.

20. The wireless power transmitter of claim 15, wherein the first voltage is the same as the second voltage.

* * * * *